United States Patent
Fukazawa et al.

(10) Patent No.: US 11,384,024 B2
(45) Date of Patent: Jul. 12, 2022

(54) NEGATIVE THERMAL EXPANSION MATERIAL, MANUFACTURING METHOD AND COMPOSITE MATERIAL THEREOF

(71) Applicant: Nippon Chemical Industrial Co., Ltd., Tokyo (JP)

(72) Inventors: Junya Fukazawa, Tokyo (JP); Toru Hata, Tokyo (JP)

(73) Assignee: Nippon Chemical Industrial Co., Ltd., Tokyo (JP)

(*) Notice: Subject to any disclaimer, the term of this patent is extended or adjusted under 35 U.S.C. 154(b) by 0 days.

(21) Appl. No.: 16/973,951

(22) PCT Filed: Jun. 14, 2019

(86) PCT No.: PCT/JP2019/023687
§ 371 (c)(1),
(2) Date: Dec. 10, 2020

(87) PCT Pub. No.: WO2020/004072
PCT Pub. Date: Jan. 2, 2020

(65) Prior Publication Data
US 2021/0246073 A1 Aug. 12, 2021

(30) Foreign Application Priority Data

Jun. 26, 2018 (JP) .............................. JP2018-120473
Nov. 5, 2018 (JP) .............................. JP2018-207953

(51) Int. Cl.
*C04B 35/447* (2006.01)
*C01B 25/45* (2006.01)
*C01B 25/37* (2006.01)

(52) U.S. Cl.
CPC .......... *C04B 35/447* (2013.01); *C01B 25/372* (2013.01); *C01B 25/45* (2013.01);
(Continued)

(58) Field of Classification Search
CPC ............ C04B 35/447; C04B 2235/326; C04B 2235/5445; C04B 2235/9607;
(Continued)

(56) References Cited

U.S. PATENT DOCUMENTS 6,187,700 B1 * 2/2001 Merkel .................... C04B 35/01
501/102
2018/0251376 A1  9/2018 Fukazawa et al.

FOREIGN PATENT DOCUMENTS

CN   102433454 A  *  5/2012
CN   102433454 A     5/2012
(Continued)

OTHER PUBLICATIONS

CN102433454A (Year: 2012).*
(Continued)

*Primary Examiner* — Karl E Group
*Assistant Examiner* — Cameron K Miller
(74) *Attorney, Agent, or Firm* — WHDA, LLP

(57) ABSTRACT

A negative thermal expansion material made of zirconium phosphate tungstate containing an Al atom, and having a thermal expansion coefficient of $-2.0 \times 10^{-6}$ to $-3.3 \times 10^{-6}$/K. According to the present invention, a negative thermal expansion material made of zirconium phosphate tungstate having various thermal expansion coefficients, and an industrially advantageous manufacturing method thereof can be provided.

9 Claims, 1 Drawing Sheet

(52) U.S. Cl.
CPC ...... *C01P 2004/61* (2013.01); *C01P 2006/12* (2013.01); *C01P 2006/32* (2013.01); *C04B 2235/326* (2013.01); *C04B 2235/5409* (2013.01); *C04B 2235/5436* (2013.01); *C04B 2235/5445* (2013.01); *C04B 2235/9607* (2013.01)

(58) Field of Classification Search
CPC ... C01B 25/372; C01B 25/45; C01P 2004/61; C01P 2006/12; C01P 2006/32
See application file for complete search history.

(56) References Cited

FOREIGN PATENT DOCUMENTS

| JP | 2002-517377 A | 6/2002 |
|---|---|---|
| JP | 2005-35840 A | 2/2005 |
| JP | 2015-10006 A | 1/2015 |
| JP | 2015-199000 A | 11/2015 |
| JP | 6105140 B1 | 3/2017 |
| JP | 6190023 B1 | 8/2017 |
| JP | 2018-2577 A | 1/2018 |
| JP | 2018-002578 A | 1/2018 |

OTHER PUBLICATIONS

Isobe et al., "Preparation and properties of negative thermal expansion $Zr_2WP_2O_{12}$ ceramics", Materials Research Bulletin, 2009, vol. 44, pp. 2045-2049, cited in Specification (5 pages).

International Search Report dated Sep. 3, 2019, issued in counterpart International Application No. PCT/JP2019/023687 (1 page).

Notice of Reasons for Refusal dated Apr. 13, 2021, issued in counterpart JP Application No. 2018-207953 (6 pages).

Decision to Grant a Patent dated Apr. 13, 2021, issued in counterpart JP Application No. 2018-207953 (2 pages).

Shang et al., "Effect of MgO and PVA on the Synthesis and Properties of Negative Thermal Expansion Ceramics of Zr2", International Journal of Applied Ceramic Technology, Sep. 2013. vol. 10 (Abstract).

\* cited by examiner

[Figure 1]
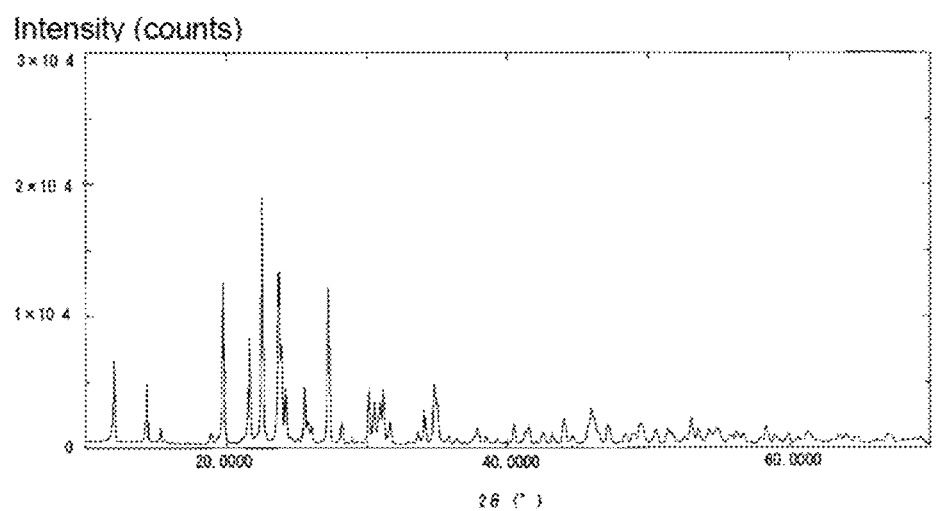
[Figure 2]
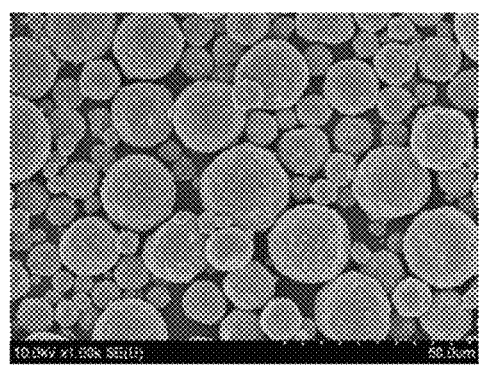

NEGATIVE THERMAL EXPANSION MATERIAL, MANUFACTURING METHOD AND COMPOSITE MATERIAL THEREOF

TECHNICAL FIELD

The Present invention relates to a negative thermal expansion material which contracts with increase in temperature, a manufacturing method thereof and a composite material comprising the negative thermal expansion material.

BACKGROUND ART

In most of materials, the length and the volume increase by thermal expansion as the temperature increases. On the other hand, a material exhibiting negative thermal expansion (hereinafter, may be also referred to as "negative thermal expansion material") is also known the volume of which contrarily reduces when it is heated. It is known that a material exhibiting negative thermal expansion can be used with other materials to suppress changes of the material due to thermal expansion caused by temperature change.

As materials exhibiting negative thermal expansion, for example, β-eucryptite, zirconium tungstate ($ZrW_2O_8$), zirconium phosphate tungstate ($Zr_2WO_4(PO_4)_2$), $Zn_xCd_{1-x}(CN)_2$, manganese nitride, bismuth-nickel-iron oxide etc. are known.

Zirconium phosphate tungstate, which has high negative thermal expansion property, has a linear expansion coefficient of −3.4 to −3.0 ppm/K at a temperature within the range of 0 to 400° C., and can be used in combination with a material exhibiting positive thermal expansion (hereinafter, may be also referred to as "positive thermal expansion material") to manufacture a material having low thermal expansion property (for example, see Patent Literatures 1 and 2, and Non Patent Literature 1).

The present inventors also previously proposed a zirconium phosphate tungstate useful as a negative thermal expansion material (Patent Literatures 3 and 4).

CITATION LIST

Patent Literature

Patent Literature 1
Japanese Patent Laid-Open No. 2005-35840
Patent Literature 2
Japanese Patent Laid-Open No. 2015-10006
Patent Literature 3
Japanese Patent Laid-Open No. 2015-199000
Patent Literature 4
Japanese Patent No. 6190023
Patent Literature 5
Japanese Patent No. 6105140

Non Patent Literature

Non Patent Literature 1
Materials Research Bulletin, 44(2009), 2045-2049.

SUMMARY OF INVENTION

Technical Problem

A negative thermal expansion material is used in combination with a positive thermal expansion material, and in view of compatibility with a positive thermal expansion material used in combination and in view of application etc., development of negative thermal expansion materials having various thermal expansion coefficients is desired.

Therefore, the object of the present invention is to provide a negative thermal expansion material made of zirconium phosphate tungstate having various thermal expansion coefficients, an industrially advantageous manufacturing method thereof and a composite material comprising the negative thermal expansion material.

Solution to Problem

In view of the above situation, the present inventors engaged in diligent study, and consequently completed the present invention by discovering that when accessory component elements such as a Mg atom, for example, are added to zirconium phosphate tungstate, the thermal expansion coefficient described below tends to be lower in comparison with the case without addition of any accessory component elements, but when an Al atom is added to zirconium phosphate tungstate, unlike the accessory component elements such as Mg atom, the thermal expansion coefficient described below tends to be higher in comparison with the case without addition of any accessory component elements, and that the thermal expansion coefficient can be varied within a specific range by varying the content of Al.

Specifically, (1) the present invention provides a negative thermal expansion material made of zirconium phosphate tungstate containing an Al atom, and having a thermal expansion coefficient of $-2.0 \times 10^{-6}$ to $-3.3 \times 10^{-6}$/K.

(2) The present invention provides the negative thermal expansion material according to (1), wherein the content of Al atom in the negative thermal expansion material is 100 to 6000 ppm by mass.

(3) The present invention provides the negative thermal expansion material according to (1) or (2), comprising one or more accessory component elements selected from the group consisting of Mg, Zn, Cu, Fe, Cr, Mn, Ni, V, Li, B, Na, K, F, Cl, Br, I, Ca, Sr, Ba, Ti, Hf, Nb, Sb, Te, Ga, Ge, La, Ce, Nd, Sm, Eu, Tb, Dy and Ho.

(4) The present invention provides the negative thermal expansion material according to any of (1) to (3), having a BET specific surface area of 0.1 to 30 $m^2/g$.

(5) The present invention provides the negative thermal expansion material according to any of (1) to (4), having an average particle size of 0.1 to 50 μm.

(6) The present invention provides a method for manufacturing a negative thermal expansion material, comprising a first step of mixing a W source, a Zr source, a P source and an Al source to prepare a slurry containing the W source, the Zr source, the P source and the Al source, a second step of spray drying the slurry to obtain a reaction precursor, and a third step of baking the reaction precursor to obtain Al-containing zirconium phosphate tungstate, wherein
in the first step, the Al source is mixed into the slurry so that the content of Al atom is 100 to 6000 ppm by mass relative to the Al-containing zirconium phosphate tungstate obtained by conducting the third step.

(7) The present invention provides the method for manufacturing a negative thermal expansion material according to (6), wherein in the first step, one or more of compounds having one or more accessory component elements selected from the group consisting of Mg, Zn, Cu, Fe, Cr, Mn, Ni, V, Li, B, Na, K, F, Cl, Br, I, Ca, Sr, Ba, Ti, Hf, Nb, Sb, Te, Ga, Ge, La, Ce, Nd, Sm, Eu, Tb, Dy and Ho is further mixed into the slurry.

(8) The present invention provides the method for manufacturing a negative thermal expansion material according to any of (6) or (7), wherein the Al source is aluminum nitrate.

(9) The present invention provides a composite material comprising the negative thermal expansion material according to any of (1) to (5) and a positive thermal expansion material.

(10) The present invention provides the composite material according to (9), wherein the positive thermal expansion material is at least one selected from metal, alloy, glass, a ceramic, rubber and resin.

Advantageous Effects of Invention

According to the present invention, a negative thermal expansion material made of zirconium phosphate tungstate having various thermal expansion coefficients of $-2.0\times10^{-6}$ to $-3.3\times10^{-6}$/K can be provided. Furthermore, according to the method for manufacturing the present invention, the negative thermal expansion material can be provided by an industrially advantageous method.

BRIEF DESCRIPTION OF DRAWINGS

FIG. 1 is an X-ray diffraction diagram of the negative thermal expansion material obtained in Example 1.

FIG. 2 is a SEM photograph of the negative thermal expansion material obtained in Example 1.

DESCRIPTION OF EMBODIMENT

The negative thermal expansion material according to the present invention is a negative thermal expansion material made of zirconium phosphate tungstate containing an Al atom, and having a thermal expansion coefficient of $-2.0\times10^{-6}$ to $-3.3\times10^{-6}$/K.

The negative thermal expansion material of the present invention is formed by adding an Al atom to zirconium phosphate tungstate. In the negative thermal expansion material of the present invention, an Al atom exists in the form of being solid-soluted in zirconium phosphate tungstate.

The zirconium phosphate tungstate according to the negative thermal expansion material of the present invention, i.e., the zirconium phosphate tungstate to which an Al atom is added is basically represented by the following general formula (1):

$$Zr_x(WO_4)_y(PO_4)_z \quad (1)$$

(wherein, x satisfies 1.7≤x≤2.3, preferably 1.8≤x≤2.1, y satisfies 0.8≤y≤1.2, preferably 0.9≤y≤1.1, and z satisfies 1.7≤z≤2.3, preferably 1.8≤z≤2.1).

The content of Al atom in the negative thermal expansion material of the present invention is 100 to 6000 ppm by mass, preferably 1000 to 5000 ppm by mass, and particularly preferably 1500 to 5000 ppm by mass relative to the whole negative thermal expansion material, i.e., the zirconium phosphate tungstate containing an Al atom and, if necessary, accessory component elements. In the negative thermal expansion material of the present invention, the thermal expansion coefficient tends to be higher as the content of Al atom increases. In the negative thermal expansion material of the present invention, when the content of Al atom is less than the above range, the effect of adding Al atom will be insufficient, and on the other hand, when the content of Al atom is more than the above range, the thermal expansion coefficient will be outside the range for practical use, and negative thermal expansion property will be impaired. In the present invention, the content of Al atom is 100 to 6000 ppm by mass, preferably 1000 to 5000 ppm by mass, and particularly preferably 1500 to 5000 ppm by mass relative to the whole negative thermal expansion material so that the negative thermal expansion material has good negative thermal expansion property. In the present invention, when the negative thermal expansion material does not contain any accessory component elements, the above-mentioned content of Al atom refers to the content relative to zirconium phosphate tungstate containing an Al atom, and when the negative thermal expansion material contains accessory component elements, the content of Al atom refers to the content relative to zirconium phosphate tungstate containing an Al atom and accessory component elements.

The zirconium phosphate tungstate according to the negative thermal expansion material of the present invention may contain accessory component elements for the purpose of enhancement of dispersibility and filling property in the positive thermal expansion material. Examples of the accessory component element include Mg, Zn, Cu, Fe, Cr, Mn, Ni, V, Li, B, Na, K, F, Cl, Br, I, Ca, Sr, Ba, Ti, Hf, Nb, Sb, Te, Ga, Ge, La, Ce, Nd, Sm, Eu, Tb, Dy and Ho, and these accessory component elements may be one or two or more of elements. Among these accessory component elements, Mg and/or V are preferable since they provide enhancement of dispersibility and filling property in the positive thermal expansion material, and Mg is particularly preferable since it has good compatibility with Al. The accessory component element refers to all elements except for Al, Zr, W, P and O which are contained in an amount of 500 ppm or more in zirconium phosphate tungstate containing an Al atom.

When the negative thermal expansion material of the present invention contains accessory component elements, the total content of the accessory component elements in the negative thermal expansion material of the present invention is preferably 0.1 to 3 mass %, and particularly preferably 0.2 to 2 mass % relative to the whole negative thermal expansion material, i.e., the zirconium phosphate tungstate containing an Al atom and accessory component elements. When the content of the accessory component elements in the negative thermal expansion material of the present invention is within the above range, the negative thermal expansion material will have excellent negative thermal expansion property and be excellent in dispersibility and filling property. When the negative thermal expansion material of the present invention contains only one accessory component element, the total content of the accessory component elements in the negative thermal expansion material of the present invention refers to the content of the one accessory component element, and when the negative thermal expansion material of the present invention contains two or more accessory component elements, the total content refers to the sum of the content of those two or more accessory component elements.

The negative thermal expansion material of the present invention is a negative thermal expansion material made of zirconium phosphate tungstate, and is characterized by the thermal expansion coefficient. In the present invention, the thermal expansion coefficient is obtained by the following procedures. First, 0.5 g of negative thermal expansion material sample and 0.05 g of binder resin are mixed, and the whole of the obtained mixture is placed in a mold of 3 mm×20 mm, then formed into a molded product using a band press at a pressure of 2 t. This molded product is baked in an electric furnace at 1100° C. for 2 hours in an air atmosphere to obtain a ceramic molded product. The thermal expansion coefficient of the obtained ceramic molded product is measured using a thermomechanical measuring apparatus in a nitrogen atmosphere under a load of 10 g at a temperature of 50 to 250° C. As a thermomechanical measuring apparatus, for example, TMA400SE manufactured by NETZSCH Japan K.K. can be used.

The thermal expansion coefficient of the negative thermal expansion material of the present invention is $-2.0 \times 10^{-6}$ to $-3.3 \times 10^{-6}$/K, preferably $-2.2 \times 10^{-6}$ to $-3.1 \times 10^{-6}$/K, and particularly preferably $-2.2 \times 10^{-6}$ to $-3.0 \times 10^{-6}$/K. A negative thermal expansion material made of conventional zirconium phosphate tungstate and zirconium phosphate tungstate containing accessory component elements has a thermal expansion coefficient of about $-3.0 \times 10^{-6}$ to $-3.3 \times 10^{-6}$/K; however, in the negative thermal expansion material of the present invention, the thermal expansion coefficients of conventional zirconium phosphate tungstate and zirconium phosphate tungstate containing an accessory component element are adjusted within the above range depending on the content of Al atom.

The BET specific surface area of the negative thermal expansion material of the present invention is not particularly limited, and is preferably 0.1 to 50 m²/g, and particularly preferably 0.1 to 20 m²/g. When the BET specific surface area of the negative thermal expansion material is within the above range, the negative thermal expansion material will be handled easily in the case of being used as a filler of resin, glass or the like.

The average particle size of the negative thermal expansion material of the present invention is not particularly limited, and the average particle size as obtained by scanning electron microscopy is preferably 0.1 to 50 µm, and particularly preferably 0.5 to 30 µm. When the average particle size of the negative thermal expansion material is within the above range, the negative thermal expansion material will be handled easily in the case of being used as a filler of resin, glass or the like.

The particle shape of the negative thermal expansion material of the present invention is not particularly limited, and for example, may be spherical shape, granular shape, plate shape, scale-like shape, whisker-like shape, bar-shaped, filament shape or crushed shape.

The negative thermal expansion material of the present invention is suitably manufactured by the method for manufacturing zirconium phosphate tungstate of the present invention described below.

The method for manufacturing zirconium phosphate tungstate of the present invention is a method for manufacturing a negative thermal expansion material, comprising a first step of mixing a W source, a Zr source, a P source and an Al source to prepare a slurry containing the W source, the Zr source, the P source and the Al source, a second step of spray drying the slurry to obtain a reaction precursor, and a third step of baking the reaction precursor to obtain Al-containing zirconium phosphate tungstate, wherein in the first step, the Al source is mixed into the slurry so that the content of Al atom is 100 to 6000 ppm by mass relative to the Al-containing zirconium phosphate tungstate obtained by conducting the third step.

The method for manufacturing zirconium phosphate tungstate of the present invention comprises a first step of mixing a W source, a Zr source, a P source and an Al source to prepare a slurry containing the W source, the Zr source, the P source and the Al source, a second step of spray drying the slurry to obtain a reaction precursor, and a third step of baking the reaction precursor to obtain Al-containing zirconium phosphate tungstate.

The first step according to the method for manufacturing zirconium phosphate tungstate of the present invention is a step of mixing a W source, a Zr source, a P source and an Al source to prepare an aqueous slurry containing the W source, the Zr source, the P source and the Al source. Specifically, in the first step, a W source, a Zr source, a P source and an Al source are dispersed in water medium to prepare an aqueous slurry in which a W source, a Zr source, a P source and an Al source are dispersed in water medium.

The W source according to the first step is a compound having a W atom. The W source is preferably a compound insoluble or hardly soluble in water, and examples thereof include tungsten trioxide, ammonium tungstate, and tungsten chloride.

The Zr source according to the first step is a compound having a Zr atom. Examples of the Zr source include zirconium hydroxide and/or zirconium carbonate. Zirconium carbonate may be a basic salt or a double salt such as ammonium, sodium and potassium.

The P source according to the first step is a compound having a P atom. As the P source, phosphoric acid is preferable.

The Al source according to the first step is a compound having an Al atom. Examples of the Al source include aluminum nitrate, aluminum sulfate, aluminum biphosphate, and aluminum lactate, and among these, aluminum nitrate is preferable since it is inexpensive and industrially easily available and since it enables a negative thermal expansion material having good negative thermal expansion property to be easily obtained.

The preparation method of the slurry in the first step is not particularly limited as long as a slurry in which each raw material is uniformly dispersed can be obtained, and it is preferable that at first an aqueous slurry in which a W source is uniformly dispersed is prepared, and a P source and a Zr source are mixed thereinto, then an Al source is mixed thereinto, since this method enables an aqueous slurry in which each raw material is uniformly dispersed to be easily prepared. In preparation of the slurry, the slurry may be subjected to wet crushing treatment by a media mill if necessary. As the media mill, a beads mill, a ball mill, a paint shaker, an attritor and a sand mill are preferable. The operating conditions of wet crushing treatment and the type and size of beads are suitably selected depending on the size of the apparatus and throughput.

In preparation of the slurry in the first step, a dispersant may be mixed into the slurry so that wet crushing treatment using a media mill is conducted more efficiently. Examples of the dispersant mixed into the slurry include various surfactants, and an ammonium salt of a polycarboxylic acid. The concentration of the dispersant in the slurry is preferably 0.01 to 10 mass %, and particularly preferably 0.1 to 5 mass % since dispersion effect is higher.

In preparation of the slurry in the first step, when wet crushing treatment using a media mill is conducted, wet crushing treatment is continued until the average particle size of the solid content obtained by laser diffraction scattering method of preferably 2 µm or less, further preferably 1 µm or less, and particularly preferably 0.1 µm or more and 0.5 µm or less is obtained. It is preferable that wet crushing treatment is continued until the average particle size of the solid content within the above range is obtained, since a reaction precursor having more excellent reactivity is obtained.

As for the amount of the P source mixed into the slurry in the first step, the molar ratio (P/W) of P atoms of the P source to W atoms of the W source in the slurry on the basis of the number of atoms is preferably 1.7 to 2.3, and particularly preferably 1.9 to 2.1. It is preferable that the molar ratio (P/W) of P atoms of the P source to W atoms of the W source in the slurry on the basis of the number of atoms is within the above range, since a reaction precursor having excellent reactivity is obtained.

As for the amount of the Zr source mixed into the slurry in the first step, the molar ratio (Zr/W) of Zr atoms of the Zr source to W atoms of the W source in the slurry on the basis of the number of atoms is preferably 1.7 to 2.3, and particularly preferably 1.9 to 2.1. It is preferable that the molar ratio (Zr/W) of Zr atoms of the Zr source to W atoms of the W source in the slurry on the basis of the number of atoms is within the above range, since a reaction precursor having excellent reactivity is obtained.

In the first step, the Al source is mixed into the slurry so that the content of Al atom of 100 to 6000 ppm by mass, preferably 1000 to 5000 ppm, and particularly preferably 1500 to 5000 ppm by mass is obtained relative to the Al-containing zirconium phosphate tungstate obtained through the third step. In the present invention, as the content of Al atom in zirconium phosphate tungstate increases, the thermal expansion coefficient of the negative thermal expansion material tends to be higher. When the content of Al atom in the slurry is less than the above range, the effect of adding Al atom to the negative thermal expansion material will be insufficient, and when the content is more than the above range, the thermal expansion coefficient of the negative thermal expansion material will be outside the range for practical use, and negative thermal expansion property will be impaired. In the present invention, when accessory component elements are not contained in the negative thermal expansion material, the Al-containing zirconium phosphate tungstate obtained through the third step refers to the zirconium phosphate tungstate containing an Al atom obtained through the third step, and when accessory component elements are contained in the negative thermal expansion material, the Al-containing zirconium phosphate tungstate refers to the zirconium phosphate tungstate containing an Al atom and accessory component elements. The amount of produced Al-containing zirconium phosphate tungstate obtained through the third step is calculated from the amount of a W source, a Zr source, a P source, an Al source and, if necessary, the compound having accessory component elements, which are mixed into the slurry in the first step.

The concentration of the slurry, i.e., the content of solid in the slurry is preferably 5 to 50 mass %, and particularly preferably 10 to 30 mass %. When the concentration of the slurry is within the above range, the viscosity which enables easy operating and handling is obtained.

As an embodiment of the first step, the first step (1) can be exemplified in which phosphoric acid and a Zr source are reacted in the slurry by using phosphoric acid as a P source and using zirconium hydroxide as a Zr source to obtain an intermediate slurry (A) in which a W source, and an amorphous compound containing P and Zr are uniformly dispersed, then an Al source is mixed into the intermediate slurry (A) to obtain the slurry (1). It is preferable that the slurry (1) obtained by conducting the first step (1) is used for the second step since a reaction precursor having excellent reactivity is obtained.

In preparation of the intermediate slurry (A) in the first step (1), the temperature at which phosphoric acid and the Zr source are reacted is preferably 5 to 100° C., and particularly preferably 20 to 90° C., and reacting time of phosphoric acid and the Zr source is preferably 0.5 hours or more.

In preparation of the intermediate slurry (A), the intermediate slurry (A) is preferably further subjected to wet crushing treatment by a media mill so that uniformity is further enhanced and a reaction precursor having high reactivity is obtained. As a media mill, a beads mill, a ball mill, a paint shaker, an attritor and a sand mill are preferable. The operating conditions of wet crushing treatment and the type and size of beads are suitably selected depending on the size of the apparatus and throughput.

In the first step (1), then, an Al source is mixed into the intermediate slurry (A), and the Al source is dispersed in the slurry by, if necessary, subjecting the slurry to mixing treatment such as stirring to obtain the slurry (1).

In the first step, in the period until the first step is completed, one or more of compounds having one or more accessory component elements selected form the group consisting of Mg, Zn, Cu, Fe, Cr, Mn, Ni, V, Li, B, Na, K, F, Cl, Br, I, Ca, Sr, Ba, Ti, Hf, Nb, Sb, Te, Ga, Ge, La, Ce, Nd, Sm, Eu, Tb, Dy, and Ho can be further mixed into the slurry.

Examples of the accessory component element include Mg, Zn, Cu, Fe, Cr, Mn, Ni, V, Li, B, Na, K, F, Cl, Br, I, Ca, Sr, Ba, Ti, Hf, Nb, Sb, Te, Ga, Ge, La, Ce, Nd, Sm, Eu, Tb, Dy, and Ho. Examples of the compound having accessory component elements include, an oxide, a hydroxide, a carbonate, an organic acid salt, an ammonium salt, a nitrate, a phosphate, a sulfate, a chloride, a bromide, and an iodide. having accessory component elements. The compounds having accessory component elements may be alone or a combination of two or more.

In the first step, as for the amount of a compound having accessory component elements mixed when the compound having accessory component elements is mixed into the slurry, the compound having accessory component elements is mixed into the slurry so that the content of the accessory component elements on the basis of the number of atoms is preferably 0.1 to 3 mass %, and particularly preferably 0.2 to 2 mass % relative to the Al-containing zirconium phosphate tungstate obtained through the third step, i.e., zirconium phosphate tungstate containing an Al atom and accessory component elements. It is preferable that the amount of the compound having accessory component elements mixed into the slurry is within the above range since the negative thermal expansion material will have excellent negative thermal expansion property and be excellent in dispersibility and filling property.

The second step according to the method for manufacturing a negative thermal expansion material of the present invention is a step of spray drying the slurry obtained in the first step to obtain a reaction precursor.

When drying treatment is conducted by spray drying, a granulated substance in which raw material particles are densely packed will be obtained, and thus zirconium phosphate tungstate containing an Al atom which is single phase based on X-ray diffraction will be more likely obtained.

In spray drying method, the slurry is atomized by the specified means and the thus generated fine droplets are dried to obtain a reaction precursor. Examples of atomizing methods of slurry include a method in which a rotating disk is used and a method in which a pressure nozzle. In the second step, either method can be used.

In spray drying method, the size of atomized droplet is not particularly limited, and is preferably 1 to 40 μm, and particularly preferably 5 to 30 μm. The amount of the slurry supplied to a spray drying apparatus is preferably determined by considering this viewpoint.

It is preferable that the temperature of hot air used for drying in the spray drying apparatus is 100 to 270° C., and preferably 150 to 230° C. so that moisture absorption of powder is prevented and recovery of powder is easier.

The reaction precursor obtained in the second step is granulated particles containing raw material components W, P and Zr for producing zirconium phosphate tungstate, Al, and in addition, accessory component elements added if necessary. The reaction precursor preferably comprises an amorphous compound containing P and Zr produced from reaction of at least phosphoric acid and a W source in the slurry so that the reaction precursor having excellent reactivity is obtained. When phosphoric acid is used as a P source and zirconium hydroxide and zirconium carbonate are used as Zr sources, it is known that phosphoric acid and the Zr source are reacted to produce an amorphous compound containing P and Zr (for example, see Japanese Patent No. 6105140, Japanese Patent No. 6190023, etc.).

The third step is a step of baking a reaction precursor to obtain the target negative thermal expansion material.

In the third step, the baking temperature at which the reaction precursor is baked is 900 to 1300° C. When the baking temperature of the reaction precursor is lower than the above range, an unreacted oxide etc. will remain, and it will tend to be harder to obtain Al-containing zirconium phosphate tungstate of single phase based on X-ray diffraction. When the baking temperature is higher than the above range, particles will solidify and stick together to form an agglomerate, and it will tend to be hard to obtain powder.

In the third step, the baking time of the reaction precursor is not particularly limited, and reaction is conducted for a sufficient period of time until Al-containing zirconium phosphate tungstate of single phase based on X-ray diffraction is produced. In the third step, in many cases, Al-containing zirconium phosphate tungstate having satisfactory various physical properties is produced with a baking time of 1 hour or more, and preferably 2 to 20 hours. In the third step, the baking atmosphere in which the reaction precursor is baked is not particularly limited, and may be either an inert gas atmosphere, a vacuum atmosphere, an oxidizing gas atmosphere or an air atmosphere.

In the third step, baking may be conducted once, or may be conducted several times if desired. Or otherwise, in the third step, the reaction precursor which has been baked once may be crushed and then baked again in order to provide uniform powder property.

In the third step, cooling is suitably conducted after baking, and if necessary, crushing, cracking, classification etc. are conducted to obtain the target Al-containing zirconium phosphate tungstate of single phase based on X-ray diffraction.

The negative thermal expansion material obtained by performing the method for manufacturing a negative thermal expansion material of the present invention is Al-containing zirconium phosphate tungstate of single phase based on X-ray diffraction. When a compound having accessory component elements is not used, the negative thermal expansion material obtained by performing the method for manufacturing a negative thermal expansion material of the present invention is zirconium phosphate tungstate containing an Al atom, and when a compound having accessory component elements is used, the obtained negative thermal expansion material is zirconium phosphate tungstate containing an Al atom and accessory component elements.

As stated above, in the method for manufacturing a negative thermal expansion material of the present invention, the negative thermal expansion material is obtained through the first step to the third step.

The average particle size of the negative thermal expansion material obtained by performing the method for manufacturing a negative thermal expansion material of the present invention is the average particle size obtained by scanning electron microscopy, and is preferably 0.1 to 50 µm, and particularly preferably 0.5 to 30 µm, and the BET specific surface area of the negative thermal expansion material is preferably 0.1 to 50 m$^2$/g, and preferably 0.1 to 20 m$^2$/g. It is preferable that the average particle size and the BET specific surface area of the negative thermal expansion material are within the above range since handling of the negative thermal expansion material will be easier when used for a filler of resin, glass or the like.

The thermal expansion coefficient of the negative thermal expansion material obtained by performing the method for manufacturing a negative thermal expansion material of the present invention, which is the thermal expansion coefficient obtained by the above described method, is $-2.0 \times 10^{-6}$ to $-3.3 \times 10^{-6}$/K, and preferably $-2.2 \times 10^{-6}$ to $-3.0 \times 10^{-6}$/K. In the method for manufacturing a negative thermal expansion material of the present invention, the thermal expansion coefficient of the negative thermal expansion material can be adjusted to the above range by adjusting the amount of Al source mixed in the first step to the above range.

The negative thermal expansion material of the present invention is used as a powder or a paste. When the negative thermal expansion material of the present invention is used as a paste, the negative thermal expansion material of the present invention can be mixed with a liquid resin having low viscosity and used in the form of a paste. Or otherwise, the negative thermal expansion material of the present invention is dispersed in a liquid resin having low viscosity, and in addition, if necessary, a binder, a flux material and a dispersant etc. are added to the dispersion, and the negative thermal expansion material of the present invention may be used in the form of a paste.

For the purpose of improving dispersibility of the negative thermal expansion material of the present invention into resin and rubber etc., the negative thermal expansion material of the present invention can be surface-treated with a silane coupling agent and used.

The negative thermal expansion material of the present invention can be used in combination with a positive thermal expansion material and used as a composite material.

The composite material of the present invention is a composite material comprising the above negative thermal expansion material of the present invention and a positive thermal expansion material.

In the composite material of the present invention, as the positive thermal expansion material used in combination with the negative thermal expansion material of the present invention, various organic compounds or inorganic compounds are used. The organic compound or the inorganic compound used as a positive thermal expansion material is not particularly limited. Examples of the organic compound used as a positive thermal expansion material include rubber, polyolefin, polycycloolefin, polystyrene, ABS, polyacrylate, polyphenylene sulfide, phenol resin, polyamide resin, polyimide resin, epoxy resin, silicone resin, polycarbonate resin, polyethylene resin, polypropylene resin, polyethylene terephthalate resin (PET resin) and polyvinyl chloride resin. Examples of the inorganic compound used as a positive thermal expansion material include silicon dioxide, graphite, sapphire, various glass materials, concrete material, various ceramic materials. Among these, the positive thermal expansion material is preferably at least one selected from metal, alloy, glass, a ceramic, rubber and resin.

As the content of the negative thermal expansion material of the present invention in the composite material of the present invention, the common content in the art is adopted. The content of the negative thermal expansion material of the present invention is selected depending on the application and required performance of the composite material of the present invention.

In the composite material of the present invention, a negative thermal expansion coefficient, zero thermal expansion coefficient or a low thermal expansion coefficient can be achieved by suitably selecting the blending ratio of the negative thermal expansion material of the present invention and other compounds. In the negative thermal expansion material of the present invention, the thermal expansion coefficient can be adjusted in the wide range of $-2.0 \times 10^{-6}$ to $-3.3 \times 10^{-6}$/K by adding an Al atom to zirconium phosphate tungstate, and thus in the composite material of the present invention using the negative thermal expansion material of the present invention, adjustment of the thermal expansion coefficient will be easy by selecting the content of the negative thermal expansion material of the present invention and the type of positive thermal expansion material.

The composite material of the present invention is suitably used as, in particular, a sealing material, a sealing material of an electronic component etc.

EXAMPLES

Hereinafter, the present invention will be described with reference to Examples, but the present invention is not limited to these Examples.

Example 1

<First Step>

15 parts by mass of commercially available tungsten trioxide ($WO_3$; average particle size 1.2 μm) was placed in a beaker, to which 150 parts by mass of pure water was further added, and the mixture was stirred at room temperature (25° C.) for 60 minutes to prepare 9 mass % slurry comprising tungsten trioxide. Then, zirconium hydroxide, 85 mass % aqueous solution of phosphoric acid and magnesium hydroxide were added to the slurry so that the molar ratio of Zr:W:P in the slurry of 2:1:2 was obtained, and 0.35 parts by mass of magnesium hydroxide was further added to the slurry, which was then stirred at room temperature (25° C.) for 60 minutes.

Then, 1.3 parts by mass of ammonium salt of polycarboxylic acid as a dispersant was added to the slurry, and the slurry was supplied into a beads mill of media stirring type provided with zirconia beads having a diameter of 0.5 mm while stirring the slurry, and wet crushing was conducted. The average particle size of the solid in the slurry after wet crushing obtained by laser diffraction scattering method was 0.3 μm.

Then, 2.8 parts by mass of aluminum nitrate nonahydrate was added to the slurry after wet crushing, and the slurry was stirred at room temperature (25° C.) for 60 minutes to obtain a raw material slurry.
<Second Step>
Then, the slurry was supplied to a spray dryer set at 220° C. at a supply rate of 2.4 L/h to obtain a reaction precursor containing an amorphous compound containing at least P and Zr.

<Third Step>
Then, the obtained reaction precursor was subjected to baking reaction at 1050° C. for 2 hours in an air atmosphere to obtain a white baked product. The baked product was crushed by a mortar to obtain zirconium phosphate tungstate powder containing an Al atom, which was used as a negative thermal expansion material sample.

The obtained negative thermal expansion material sample was subjected to X-ray diffraction analysis, and as a result, the baked product was $Zr_2(WO_4)(PO_4)_2$ of single phase.

Example 2

In the first step, operations in the same manner as in Example 1 were conducted except that aluminum nitrate nonahydrate added to the slurry after wet crushing was 1.1 parts by mass, and thus zirconium phosphate tungstate powder containing an Al atom was obtained, which was used as a negative thermal expansion material sample.

The obtained negative thermal expansion material sample was subjected to X-ray diffraction analysis, and as a result, the baked product was $Zr_2(WO_4)(PO_4)_2$ of single phase.

Example 3

In the first step, operations in the same manner as in Example 1 were conducted except that aluminum nitrate nonahydrate added to the slurry after wet crushing was 0.84 parts by mass, and thus zirconium phosphate tungstate powder containing an Al atom was obtained, which was used as a negative thermal expansion material sample.

The obtained negative thermal expansion material sample was subjected to X-ray diffraction analysis, and as a result, the baked product was $Zr_2(WO_4)(PO_4)_2$ of single phase.

Example 4

In the first step, operations in the same manner as in Example 1 were conducted except that aluminum nitrate nonahydrate added to the slurry after wet crushing was 0.56 parts by mass, and thus zirconium phosphate tungstate powder containing an Al atom was obtained, which was used as a negative thermal expansion material sample.

The obtained negative thermal expansion material sample was subjected to X-ray diffraction analysis, and as a result, the baked product was $Zr_2(WO_4)(PO_4)_2$ of single phase.

Comparative Example 1

<First Step>
15 parts by mass of commercially available tungsten trioxide ($WO_3$; average particle size 1.2 μm) was placed in a beaker, to which 150 parts by mass of pure water was further added, and the mixture was stirred at room temperature (25° C.) for 60 minutes to prepare 9 mass % slurry comprising tungsten trioxide. Then, zirconium hydroxide, 85 mass % aqueous solution of phosphoric acid and magnesium hydroxide were added to the slurry so that the molar ratio of Zr:W:P in the slurry of 2:1:2 was obtained, and 0.35 parts by mass of magnesium hydroxide was further added to the slurry, which was then stirred at room temperature (25° C.) for 60 minutes.

Then, 1.3 parts by mass of ammonium salt of polycarboxylic acid as a dispersant was added to the slurry, and the slurry was supplied into a beads mill of media stirring type provided with zirconia beads having a diameter of 0.5 mm while stirring the slurry, and wet crushing was conducted.

The average particle size of the solid in the slurry after wet crushing obtained by laser diffraction scattering method was 0.3 µm.
<Second Step>

Then, the slurry was supplied to a spray dryer set at 220° C. at a supply rate of 2.4 L/h to obtain a reaction precursor containing an amorphous compound containing at least P and Zr.
<Third Step>

Then, the obtained reaction precursor was subjected to baking reaction at 1050° C. for 2 hours in an air atmosphere to obtain a white baked product. The baked product was crushed by a mortar to obtain zirconium phosphate tungstate powder, which was used as a negative thermal expansion material sample.

The obtained negative thermal expansion material sample was subjected to X-ray diffraction analysis, and as a result, the baked product was $Zr_2(WO_4)(PO_4)_2$ of single phase.

Comparative Example 2

Operations in the same manner as in Comparative Example 1 were conducted except that magnesium hydroxide was not added to the slurry in the first step of Comparative Example 1, and thus a white baked product was obtained. The baked product was crushed by a mortar to obtain zirconium phosphate tungstate powder, which was used as a negative thermal expansion material sample.

The obtained negative thermal expansion material sample was subjected to X-ray diffraction analysis, and as a result, the baked product was $Zr_2(WO_4)(PO_4)_2$ of single phase.
<Evaluation of Physical Properties>

The average particle size, the BET specific surface area and the thermal expansion coefficient were measured for the negative thermal expansion material samples obtained in Examples and Comparative Examples. The average particle size and the thermal expansion coefficient were measured as described below. The results are shown in Table 1. The X-ray diffraction diagram of the negative thermal expansion material sample obtained in Example 1 is shown in FIG. 1, and the SEM photograph is shown in FIG. 2.

(Average Particle Size)

The average particle size of the negative thermal expansion material sample was obtained from the average value of 50 or more particles randomly extracted in scanning electron microscopy at 400 magnification.

(Linear Thermal Expansion Coefficient)
<Production of Ceramic Molded Product>

0.5 g of negative thermal expansion material sample obtained in each Example and Comparative Example, and 0.05 g of binder (SpectroBlend 44 µm Powder) were mixed by a mortar for 5 minutes, and the whole of the mixture was placed in a mold of 3 mm×20 mm. Then, the mixture was molded at pressure of 2 t using a hand press to produce a powder molded product. The obtained powder molded product was baked in an electric furnace at 1100° C. for 2 hours in an air atmosphere to obtain a ceramic molded product of zirconium phosphate tungstate.
<Measurement of Thermal Expansion Coefficient>

The linear thermal expansion coefficient of a ceramic molded product was measured using a thermomechanical measuring apparatus (manufactured by NETZSCH Japan K.K.). The measurement conditions were in a nitrogen atmosphere, under a load of 10 g and temperature range of 50° C. to 250° C.

TABLE 1

| | Content of Al | Accessory component element | | Linear expansion coefficient | Average particle size | BET specific surface area |
|---|---|---|---|---|---|---|
| | (ppm by mass) [1] | Element | Content (ppm) [2] | ($\times 10^{-5}$/K) | (µm) | (m$^2$/g) |
| Example 1 | 5000 | Mg | 3600 | −2.2 | 22.8 | 0.36 |
| Example 2 | 2000 | Mg | 3600 | −2.8 | 19.5 | 0.21 |
| Example 3 | 1500 | Mg | 3600 | −3.0 | 20.2 | 0.18 |
| Example 4 | 1000 | Mg | 3600 | −3.1 | 21.9 | 0.29 |
| Comparative Example 1 | 0 | Mg | 3600 | −3.3 | 23.8 | 0.36 |
| Comparative Example 2 | — | — | — | −3.0 | 19.4 | 1.50 |

[1] Content of Al refers to the ratio of Al atoms in aluminum nitrate relative to whole Al-containing zirconium phosphate tungstate produced the third step.
[2] Content of Mg refers to the ratio of Mg atoms in magnesium hydroxide relative to whole Al-containing zirconium phosphate tungstate produced the third step.

From the results of Table 1, it can be seen that the linear expansion coefficient of zirconium phosphate tungstate is lower when Mg is added as apparent from Comparative Example 1 and Comparative Example 2. On the other hand, as apparent from Comparative Example 1 and Examples 1 to 4, it can be seen that the linear expansion coefficient of zirconium phosphate tungstate is higher when Al is added, and Mg and Al have different influences on the negative thermal expansion property. As apparent from Examples 1 to 4, it can be seen that the linear expansion coefficient of zirconium phosphate tungstate can be adjusted by varying the content of Al.

Examples 4 and 5, and Reference Example 1

<Production of Epoxy Resin Composite>

The negative thermal expansion material sample obtained in Example 3 was weighed so that the volume % (Vol %) value shown in Table 2 relative to 4 g of liquid epoxy resin (Mitsubishi Chemical Corporation, 828EL) was obtained, 0.12 g of curing agent (SHIKOKU CHEMICALS CORPORATION, CUREZOL 2E4MZ) was added to the sample, which was then mixed in a mixer at a rotational speed of 2000 rpm for 1 minute to produce a paste, and the obtained paste was placed in 1.5 ml microtube container. Then, the paste was kept at 80° C. for 2 hours while being rotated in a dryer, then cured at 150° C. for 0.5 hours in a still-standing state to obtain an epoxy resin composite material sample.

The obtained epoxy resin composite material sample was cut, and the linear expansion of the sample was measured using a thermomechanical measuring apparatus (TMA4000SE manufactured by NETZSCH Japan K.K.) at a load of 50 g and temperature rising speed of 5° C./min to obtain the thermal expansion coefficient (CTE) within the range of 40 to 200° C. The results were shown in Table 2.

Furthermore, similar tests were conducted for an epoxy resin not containing any filler (blank) and an epoxy resin containing a silica filler (average particle size 6.4 µm: HIPRESICA manufactured by Ube Nitto Kasei Co., Ltd.) (Reference Example 1), and the results were also shown in Table 2.

TABLE 2

| | Filler | | |
| --- | --- | --- | --- |
| | Type | Amount blended (Vol %) | Thermal expansion coefficient ppm/K |
| Example 4 | Example 3 | 20 | 72.1 |
| Example 5 | Example 3 | 40 | 50.6 |
| Reference Example 1 | Silica | 40 | 64.1 |
| Blank | — | — | 95.6 |

As apparent form Table 2, it can be seen that the epoxy resin composite in which the negative thermal expansion material of the present invention is contained in an epoxy resin exhibited suppressed thermal expansion compared to an epoxy resin without addition of any fillers (blank), and that the epoxy resin to which 40 Vol % of the filler was blended (Example 5) exhibited suppressed thermal expansion compared to an epoxy resin to which silica is blended in the same amount (Reference Example 1).

The invention claimed is:

1. A negative thermal expansion material made of zirconium phosphate tungstate containing an Al atom, and having a thermal expansion coefficient of $-2.0\times10^{-6}$ to $-3.0\times10^{-6}$/K, wherein
   the zirconium phosphate tungstate containing an Al is Al-containing zirconium phosphate tungstate of single phase based on X-ray diffraction,
   the content of Al atom is 100 to 6000 ppm by mass, and
   the negative thermal expansion material has an average particle size of 0.1 to 50 µm.

2. The negative thermal expansion material according to claim 1, comprising one or more accessory component elements selected from the group consisting of Mg, Zn, Cu, Fe, Cr, Mn, Ni, V, Li, B, Na, K, F, Cl, Br, I, Ca, Sr, Ba, Ti, Hf, Nb, Sb, Te, Ga, Ge, La, Ce, Nd, Sm, Eu, Tb, Dy and Ho.

3. The negative thermal expansion material according to claim 1, having a BET specific surface area of 0.1 to 30 m²/g.

4. A method for manufacturing a negative thermal expansion material, comprising a first step of mixing a W source, a Zr source, a P source and an Al source to prepare a slurry containing the W source, the Zr source, the P source and the Al source, a second step of spray drying the slurry to obtain a reaction precursor, and a third step of baking the reaction precursor to obtain Al-containing zirconium phosphate tungstate, wherein
   in the first step, the Al source is mixed into the slurry so that the content of Al atom is 100 to 6000 ppm by mass relative to the Al-containing zirconium phosphate tungstate obtained by conducting the third step, and
   a thermal expansion coefficient of the Al-containing zirconium phosphate tungstate obtained by conducting the third step is $-2.0\times10^{-6}$ to $-3.0\times10^{-6}$/K, and the negative thermal expansion material has an average particle size of 0.1 to 50 µm.

5. The method for manufacturing a negative thermal expansion material according to claim 4, wherein in the first step, one or more of compounds having one or more accessory component elements selected from the group consisting of Mg, Zn, Cu, Fe, Cr, Mn, Ni, V, Li, B, Na, K, F, Cl, Br, I, Ca, Sr, Ba, Ti, Hf, Nb, Sb, Te, Ga, Ge, La, Ce, Nd, Sm, Eu, Tb, Dy and Ho is further mixed into the slurry.

6. The method for manufacturing a negative thermal expansion material according to claim 4, wherein the Al source is aluminum nitrate.

7. A composite material comprising the negative thermal expansion material according to claim 1 and a positive thermal expansion material.

8. The composite material according to claim 7, wherein the positive thermal expansion material is at least one selected from metal, alloy, glass, a ceramic, rubber and resin.

9. A negative thermal expansion material made of zirconium phosphate tungstate containing an Al atom, and having a thermal expansion coefficient of $-2.0\times10^{-6}$ to $-3.0\times10^{-6}$/K, wherein
   the zirconium phosphate tungstate containing an Al is Al-containing zirconium phosphate tungstate of single phase based on X-ray diffraction,
   the content of Al atom is 100 to 6000 ppm by mass, and
   the negative thermal expansion material has a BET specific surface area of 0.1 to 30 m²/g, and the negative thermal expansion material has an average particle size of 0.1 to 50 µm.

* * * * *